(12) United States Patent
Ortmueller et al.

(10) Patent No.: US 11,505,051 B2
(45) Date of Patent: Nov. 22, 2022

(54) PROFILE STRIP ARRANGEMENT

(71) Applicant: Elkamet Kunststofftechnik GmbH, Biedenkopf (DE)

(72) Inventors: Michael Ortmueller, Dautphetal-Herzhausen (DE); David Landeck, Marburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 463 days.

(21) Appl. No.: 16/632,569

(22) PCT Filed: Aug. 13, 2018

(86) PCT No.: PCT/EP2018/071864
§ 371 (c)(1),
(2) Date: Jan. 21, 2020

(87) PCT Pub. No.: WO2019/034578
PCT Pub. Date: Feb. 21, 2019

(65) Prior Publication Data
US 2021/0129648 A1    May 6, 2021

(30) Foreign Application Priority Data
Aug. 16, 2017  (DE) ............ 10 2017 118 663.8

(51) Int. Cl.
*B60J 10/70* (2016.01)
*B60J 10/18* (2016.01)
*B60J 10/27* (2016.01)

(52) U.S. Cl.
CPC ............ *B60J 10/70* (2016.02); *B60J 10/18* (2016.02); *B60J 10/27* (2016.02)

(58) Field of Classification Search
None
See application file for complete search history.

(56) References Cited

U.S. PATENT DOCUMENTS 10,611,221 B2 *   4/2020   Schlater ................. B60J 10/70
2003/0057660 A1   3/2003   Ortmueller et al.
(Continued)

FOREIGN PATENT DOCUMENTS

DE    3606566 A1    9/1987
DE    3702555 A1    8/1988
(Continued)

*Primary Examiner* — Alexander S Thomas
(74) *Attorney, Agent, or Firm* — Leydig, Voit & Mayer, Ltd.

(57) ABSTRACT

A profile strip arrangement includes a profile strip having first and second connecting areas. The first connecting area has a connecting section configured to establish a connection to an inside of a windshield and the second connecting area has a U-shaped or V-shaped material section having two legs which delimit a groove-shaped receiving area configured to receive a latching section of a windshield cowl cover. As seen in a cross section of the profile strip, at least a partial layer of the connecting section, which is oriented in parallel to a top of the connecting section facing the windshield, and at least a partial layer of a bottom section of the U-shaped or V-shaped material section together form a continuous base section of the profile strip which extends in one plane and from which the legs of the U-shaped or V-shaped material section project.

18 Claims, 7 Drawing Sheets

Fig. 1

(56) References Cited

U.S. PATENT DOCUMENTS

| | | |
|---|---|---|
| 2007/0246966 A1 | 10/2007 | Polke |
| 2011/0115261 A1 | 5/2011 | Platt et al. |
| 2015/0246603 A1 | 9/2015 | Silvestrini |
| 2018/0154752 A1 | 6/2018 | Trombetta et al. |

FOREIGN PATENT DOCUMENTS

| | | |
|---|---|---|
| DE | 3813894 A1 | 2/1990 |
| DE | 20008555 U1 | 8/2000 |
| DE | 102004030465 A1 | 1/2006 |
| DE | 202008006986 U1 | 10/2009 |
| DE | 102009010015 A1 | 8/2010 |
| DE | 212013000078 U1 | 10/2014 |
| DE | 202014106202 U1 | 3/2016 |
| EP | 2253556 A1 | 11/2010 |
| JP | 2015157527 A | 9/2015 |
| WO | WO 2006002891 A2 | 1/2006 |
| WO | WO 2014041279 A1 | 3/2014 |
| WO | WO 2016189238 A1 | 12/2016 |

\* cited by examiner

PROFILE STRIP ARRANGEMENT

CROSS-REFERENCE TO PRIOR APPLICATIONS

This application is a U.S. National Phase application under 35 U.S.C. § 371 of International Application No. PCT/EP2018/071864, filed on Aug. 13, 2018, and claims benefit to German Patent Application No. DE 10 2017 118 663.8, filed on Aug. 16, 2017. The International Application was published in German on Feb. 21, 2019 as WO 2019/034578 under PCT Article 21(2).

FIELD

The invention relates to a profile strip arrangement comprising a profile strip having a first connecting area that serves to establish a connection to an edge area of a windshield of a motor vehicle and having a second connecting area that serves to establish a connection to a windshield cowl cover situated adjacent to the windshield, whereby the first connecting area has a connecting section that serves to establish a connection to an inside of the windshield and whereby the second connecting area has a U-shaped or V-shaped material section to delimit a groove-shaped receiving area, whereby the receiving area is configured to receive a latching section of the windshield cowl cover so as to latch it, whereby the outside of the windshield cowl cover, the outside of the profile strip and the outside of the windshield are flush with each other.

BACKGROUND

Profile strip arrangements that are known from the state of the art, for example, from German utility model DE 200 08 555 U1 and from international patent application WO 2006/002891 A2, serve to connect a lower edge area of the windshield of a motor vehicle to a so-called windshield cowl cover. This windshield cowl cover is normally latched to a connecting area of the profile strip in that a latching section in the form of a fastening tab of the windshield cowl cover is inserted into a receiving area of the connecting area of the profile strip and latched there.

A windshield cowl cover serves to cover a windshield cowl that collects water running off the motor vehicle windshield and that drains it away in a controlled manner into the engine compartment and underneath the motor vehicle. The windshield cowl can be part of the car body. The profile strip arrangements known from German utility model DE 200 08 555 U1 and from international patent application WO 2006/002891 A2 allow a smooth and aerodynamically favorable transition to the adjacent windshield cowl cover in the area of the lower rim of the windshield.

After the profile strip has been manufactured, it is connected to the edge area of the windshield, usually glued to it. This assembly step is normally carried out by the suppliers, so that the suppliers can provide the automobile manufacturer with a module consisting of the windshield and the profile strip that is connected to the windshield. This module is then connected (usually glued) to a windshield receptacle of the car body within the scope of the final assembly of a motor vehicle; moreover, the adjacent windshield cowl cover is joined to the profile strip.

While the above-mentioned module is being transported from the supplier to the automobile manufacturer, the ("second") connecting area of the profile strip, which is intended to establish a connection to the windshield cowl cover, projects from the windshield and is thus exposed to mechanical influences. At the same time, however, it is desirable for the module to be transported in a space-saving and "standing" position, that is to say, for the windshield to be transported upright. Moreover, it is also desirable for the windshield to be protected against damage to the lower edge area during the transport. Such a protection is ensured in that the windshield is supported on the second connecting area of the profile strip while it is being transported. However, this means that the weight of the windshield bears down on the second connecting area of the profile strip during the transport of the module. This load brings about an undesired deformation of the second connecting area of the profile strip, which delimits the receiving area. Here, it has been found that profile strip arrangements whose outer sides are flat/flush on the outside are particularly damage-prone since they lack a section that surrounds the top of the rim of the windshield (see German patent application DE 37 02 555 A1).

In order to prevent deformation of a profile strip that is connected to a windshield, it is known from the state of the art (for example, from international patent application WO 2006/002891 A2, European patent application EP 2 253 556 A1 and international patent application WO 2014/041279 A1) to reinforce the second connecting area of the profile strip by using a transport protection strip (also referred to as a "keder rail"), whereby at least part of its cross section is arranged in the receiving area of the second connecting area.

After the module consisting of the "windshield and profile strip" has been delivered to the automobile manufacturer, the transport protection strip is then removed from the receiving area of the profile strip so that the second connecting area can be connected to the windshield cowl cover. The transport protection strip is subsequently disposed of.

In order to remove the transport protection strip from the receiving area of the second connecting area of the profile strip, European patent application EP 2 253 556 A1 proposes providing the transport protection strip with an additional handling section in the form of a grip tab so that the transport protection strip can be pulled out of the receiving area of the profile strip by manually pulling on the grip tab. A similar handling section in the form of a pull-out ring is disclosed in international patent application WO 2014/041279 A1.

SUMMARY

In an embodiment, the present invention provides a profile strip arrangement including a profile strip having a first connecting area configured to establish a connection to an edge area of a windshield of a motor vehicle and having a second connecting area configured to establish a connection to a windshield cowl cover situated adjacent to the windshield. The first connecting area has a connecting section configured to establish a connection to an inside of the windshield and the second connecting area has a U-shaped or V-shaped material section having two legs which delimit a groove-shaped receiving area configured to receive a latching section of the windshield cowl cover so as to latch the latching section. As seen in a cross section of the profile strip, at least a partial layer of the connecting section, which is oriented in parallel to a top of the connecting section facing the windshield, and at least a partial layer of a bottom section of the U-shaped or V-shaped material section together form a continuous base section of the profile strip which extends in one plane and from which the legs of the U-shaped or V-shaped material section project.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

The above-mentioned additional handling sections simplify the removal of the transport protection strip from the connecting area of the profile strip. However, the transport protection strip and the handling sections first have to be manufactured as individual parts and then the supplier has to mount them onto the profile strip. After the module has been transported to the automobile manufacturer, the automobile manufacturer has to then dismantle the transport protection strip and the handling sections. Finally, the transport protection strip and the handling sections have to be collected and disposed of.

Before this backdrop, an embodiment of the present invention provides a profile strip arrangement with which it is possible to reduce the effort involved in the production, transport and assembly of a profile strip arrangement.

This is achieved according to an embodiment with a profile strip arrangement of the above-mentioned type in that, as seen in the cross section of the profile strip, at least a partial layer of the connecting section, which is oriented in parallel to the top of the connecting section facing the windshield, and at least a partial layer of the bottom section of the U-shaped or V-shaped material section together form a continuous base section of the profile strip which extends in one plane and from which the two legs of the U-shaped or V-shaped material section project.

The profile strip arrangement according to an embodiment of the invention has a profile strip with a base section. This base section is formed jointly by at least one partial layer of the connecting section of the first connecting area and by at least one partial layer of the bottom section of the U-shaped or V-shaped material section. This base section is continuous so that forces can be transmitted along the cross section of the base section. Especially during the transport of a module comprising a windshield and a profile strip attached to it, these forces can be introduced into the bottom section of the profile strip as well as into the connecting section of the first connecting area. Since the two legs of the U-shaped or V-shaped material section project from the base section, it is achieved that, if the above-mentioned module is being transported in an upright position, compressive forces stemming from the weight of the windshield are not introduced into the outer leg of the U-shaped or V-shaped material section. Consequently, this exposed outer leg can be uncoupled from a force flow during the transport. The continuity of the base section makes it possible for the forces introduced into the bottom section of the U-shaped or V-shaped material section to be transmitted into the connecting section along the extension of the base section, without any risk of buckling of the bottom section relative to the connecting section.

The profile strip arrangement according to an embodiment of the invention makes it possible to dispense with the arrangement of a keder rail in the receiving area of the second connecting area during the transport of a module (windshield and profile strip). This means that the keder rail does not have to be provided nor does it have to be joined to the receiving area nor does it have to be removed again from the receiving area nor does it have to be subsequently disposed of.

This simplifies the production and transport as well as the assembly of a profile strip arrangement.

The base section can extend in a slightly curved plane, but preferably in a straight plane, so that compressive forces introduced into the face of the base section can be transmitted virtually free of transverse forces along the extension of the base section.

Another way to increase the stability of the base section is for the bottom section and the connecting section to make a stepless transition into each other at their respective bottoms and/or at their respective tops. This permits the best possible use of the material volume needed for the base section. Moreover, this makes optimal use of the usually limited installation space available in the area of the transition between the windshield cowl cover and the lower rim of the windshield. Last but not least, the continuous transitions at the bottom and/or at the top between the bottom section and the connecting section provide optimal protection against buckling of the bottom section relative to the connecting section.

In the especially preferred case that the bottom section and the connecting section make a stepless transition into each other both at their respective bottoms and at their respective tops, the entire material volume of the base section can be used to transmit force. In this case, the base section is made up of the entire thickness of the connecting section and of the entire thickness of the bottom section (that is to say, it is not made up only of partial layers that might be present).

The base section is especially a flat element section. The thickness of such a flat element section is preferably at least one millimeter. Preferably, this thickness is five millimeters at the maximum. It is also especially preferable for the thickness along the extension of the flat element section to remain the same (as seen in the cross section).

It is also especially advantageous for the profile strip to be reinforced along its extension by means of at least one reinforcement insert. This can especially be a metal reinforcement insert made of aluminum or steel.

It is especially preferable for at least one partial section of the at least one reinforcement insert to extend in a preferably straight plane as seen in the cross section of the profile strip, whereby a first area of the partial section is at least partially arranged in the connecting section and a second area of the same partial section is arranged in the bottom section. In this manner, especially a transition area between the bottom section and the connecting section can be reinforced.

Another optimized arrangement is achieved if the reinforcement insert extends along the entire connecting section or along the entire bottom section, and especially if it extends along the entire connecting section as well as along the entire bottom section. This means that at least 90% of the length of an above-mentioned section (connecting section or bottom section) is supposed to be reinforced by means of the reinforcement insert. Therefore, it is possible for the material of the profile strip (normally an elastic plastic material) to enclose the face of the reinforcement insert (by a maximum of 10% of the length of that particular section), so that the reinforcement insert is protected against weather influences and mechanical effects.

Furthermore, it is preferred for a reinforcement insert to be provided that has at least one partial section to reinforce a leg of the U-shaped or V-shaped material section. Such a reinforcement insert can be a reinforcement insert that reinforces exclusively one or else both legs of the U-shaped or V-shaped material section. Preferably, however, it is the section of a reinforcement insert that also at least partially reinforces the base section.

An arrangement that is particularly well-suited to provide protection without the use of a keder rail is achieved when the profile strip has a material projection that functions as a support element and that is arranged adjacent to a leg of the U-shaped or V-shaped material section that—relative to the bottom section—is arranged on the side facing away from the connecting section.

Such a support element creates a material area onto which the profile strip can be placed when a windshield is being transported. The support element offers mechanical protection for the other areas of the profile strip and can thus be optimized in terms of its geometry when it comes to this support function.

An especially preferred cross section geometry of the material projection is for it to have a nub-like shape, that is to say, a partially circular cross section, thus making it possible to introduce weight-induced contact forces into the material projection and from there into the profile strip, even in case of an uneven contact surface.

It is particularly preferable for the material projection to be arranged at the level of the base section. In this manner, during transport, weight-induced contact forces exerted by the windshield can be introduced into the material projection and from there into the base section in a direct manner and without any diversion.

It is especially preferred for the material projection to be an integral part of the base section so that forces introduced into the material projection can be transmitted without any losses into other areas of the base section.

It is also preferable for the material projection and the base section to be made of the same material, as a result of which the integral production of the base section and of the material projection (preferably by way of extrusion) is simplified.

In another advantageous embodiment, it is provided for the material projection to be reinforced by means of at least one reinforcement insert of the profile strip. This can especially be a reinforcement insert that reinforces the base section, at least in certain areas. In particular, the base section, along with the integrally formed material projection, and the reinforcement insert extend in the same plane, which is preferably straight.

In another embodiment of the invention, it is provided for the profile strip to have a central section that is adjacent to, or that forms, a leg of the U-shaped or V-shaped material section and that, after installation, more closely adjoins a rim of the windshield than the other, outer leg of the U-shaped or V-shaped material section does, whereby the central section projects from the base section. Such a central section makes it possible, for example, to provide a material section of the profile strip that is directly adjacent to a rim of the windshield. With such a section, forces that have been introduced into the base section can also be introduced into a side rim of the windshield via the central section.

In particular, if the central section forms an inner leg of the U-shaped or V-shaped material section and/or if the central section is to serve for the above-mentioned dissipation of forces, then it is preferred if the cross section of the central section is thicker than the outer leg of the U-shaped or V-shaped material section. In this manner, the greater stability does not come at the expense of the deformability of the outer leg of the U-shaped or V-shaped material section, a characteristic which is normally needed or desired, so that the latching section of the windshield cowl cover can be inserted into the receiving area of the second connecting area under deformation of the outer leg.

Another way to utilize the central section is for it to have a sealing element to create an external seal between adjacent rims of the windshield and of the windshield cowl cover. This sealing element is preferably flat at the top in order to create a completely flush surface transition to the outside of the windshield and to the outside of the windshield cowl cover. In the context of the present invention, this is not a mathematically perfect flush state but rather a flush state that can be implemented within the scope of the existent manufacturing possibilities in mass production.

The very sturdy configuration of the profile strip according to embodiments of the invention especially makes it possible for the central section and/or the outer leg of the U-shaped or V-shaped material section to be able to have a latching element that protrudes into the receiving area and that serves to be latched to the latching section of the windshield cowl cover. The latching element can be a relatively small latching lip that can be made of a softer material than the rest of the material of the profile strip. This arrangement permits particularly convenient and reliable latching to the latching section of the windshield cowl cover, as is described, for example, in German utility model DE 20 2008 006 986 U1 of the same applicant.

The above-mentioned latching element can especially be formed by a projection of a soft layer of material that divides the central section into a material section facing the bottom and a material section facing the sealing element.

Additional features and advantages of embodiments of the invention are the subject matter of the description below and of the illustrative depiction of preferred embodiments.

Figure 1:
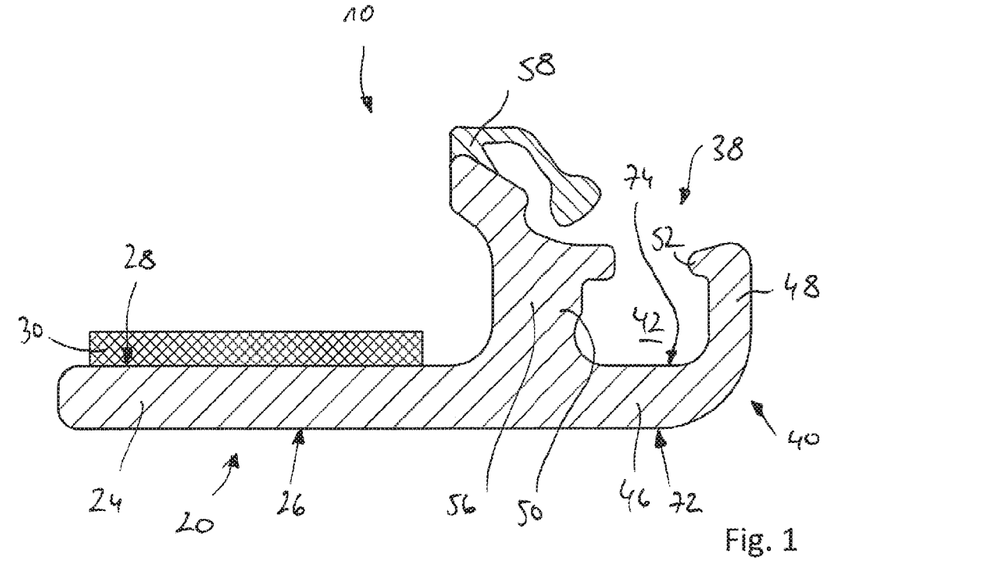
FIG. 1 shows a cross section of an embodiment of the profile strip.
Figure 2:
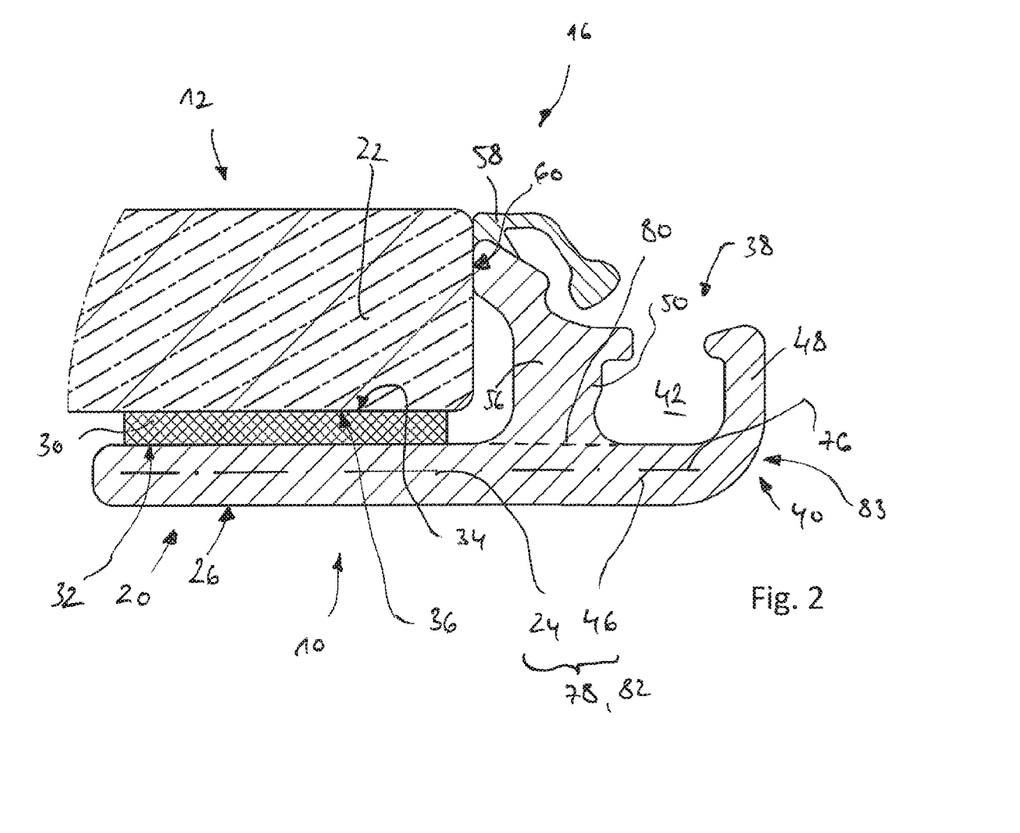
FIG. 2 shows a cross section of an embodiment of a module comprising a profile strip as shown in FIG. 1 as well as a windshield.
Figure 3:
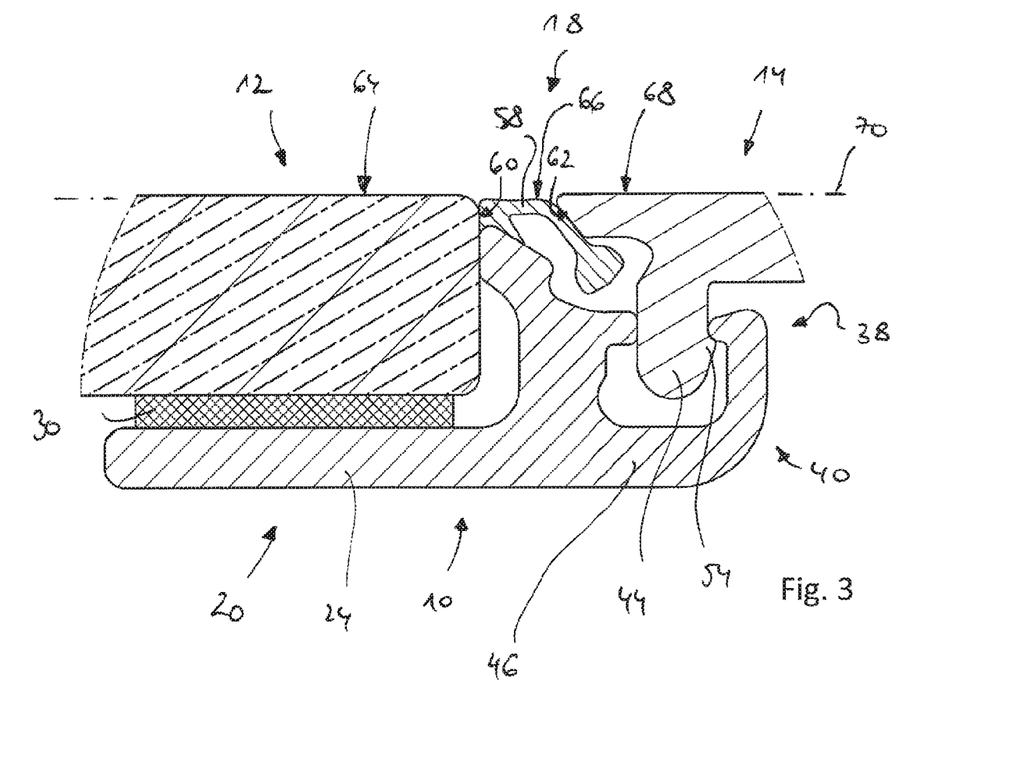
FIG. 3 shows a cross section of an embodiment of a profile strip arrangement comprising the module as shown in FIG. 2 and a windshield cowl cover.

Making reference to FIGS. 1 to 3, a profile strip is designated in its entirety by the reference numeral 10, a windshield is designated by the reference numeral 12, and a windshield cowl cover is designated by the reference numeral 14. The profile strip 10 and the windshield 12 together form a module 16. The module 16 and the windshield cowl cover 1 together form a profile strip arrangement 18 (see FIG. 3).

The profile strip 10 has a first connecting area that serves to establish a connection to an edge area 22 of the windshield 12. The first connecting area 20 comprises a connecting section 24 having a bottom 26 and a top 28. The top 28 of the connecting section has an adhesive layer 30 whose bottom 32 is glued to the top 28 of the connecting section 24 and whose top 34 is glued to the inside 36 of the windshield.

The profile strip 10 has a second connecting area 38 that serves to establish a connection to the windshield cowl cover 14. The second connecting area 38 has a U-shaped material section 40 delimiting a groove-shaped receiving area 42 that serves to receive a latching section 44 of the windshield cowl cover 14 so as to latch it (see FIG. 3).

The U-shaped material section 40 has a bottom section 46 as well as an outer leg 48 and an inner leg 50. On at least one of the legs 48, 50, there is a latching element 52 that serves to be latched to a latching projection 54 of the latching section 44 of the windshield cowl cover 14.

The inner leg 50 is formed by a central section 56 whose cross section is thicker than the outer leg 48.

The central section 56 has a sealing element 58. The latter serves to create an external seal between adjacent rims 60 and 62 of the windshield 12 or of the windshield cowl cover 14 (see FIG. 3).

The outside 64 of the windshield 12, the outside 66 of the sealing element 58 and the outside 68 of the windshield cowl cover 14 are flush with each other and together they form a continuous outer skin 70 of a motor vehicle.

The bottom section 46 has a bottom 72, and also a top 74 that is part of the delimitation of the groove-shaped receiving area 42.

The connecting section 24 of the first connecting area 20 and the bottom section 46 of the U-shaped material section 40 together form a continuous base section 78 extending in a straight plane 76 (see FIG. 2).

The transition between the base section 78 and the central section 56 is shown in FIG. 2 by a broken line 80. The central section 56 or the inner leg 50 and the outer leg 48 project from the base section 78 in the direction of the outer skin 70 (see FIG. 3).

The base section 78 is configured in the form of a flat element section 82. As seen along the plane 76 (that is to say, in the cross section of the profile strip 10), the thickness of the flat element section measured perpendicular to the outer skin 70 is constant and amounts, for example, to between about one millimeter and about five millimeters.

After a profile strip 10 as shown in FIG. 1 has been manufactured, it is joined to the windshield 12 by means of an adhesive layer 30. This gives rise to the module shown in FIG. 2. During the transport of this module 16, space considerations make it preferable to arrange the windshield 12 upright, that is to say, in a standing position, in other words, in an orientation that is rotated clockwise by approximately 90° relative to the depiction in FIG. 2.

The profile strip 10 serves to protect the edge area 22 of the windshield 12 during the transport. In this process, the weight of the windshield 12 rests on a face section 83 of the base section 78. The force that the contact surface introduces into the face section 83 is transmitted into the base section 78 and from there, via the central section 56, into the rim 60 of the windshield 12 and via the adhesive layer 30 and the inside 36 likewise into the windshield 12.

The continuous base section 78 creates a buckling-resistant arrangement that makes it possible to dispense with a keder rail arranged inside the groove-shaped receiving area 42 while the module 16 is being transported.

After the module 16 has been delivered to an automobile manufacturer, the module 16 can be connected to the car body of a motor vehicle that is being produced by gluing the windshield 12 to a windshield frame of the motor vehicle. Subsequently, the otherwise customary assembly step of removing a keder rail from the receiving area 42 is eliminated; rather, the assembly of the windshield cowl cover 14 can be started right away by inserting the latching section 44 into the receiving area 42 and latching it there. This gives rise to an arrangement with a flush surface as shown in FIG. 3.

The embodiments shown in FIGS. 4 to 7 have additional advantageous features as compared to the embodiments shown in FIGS. 1 to 3 described above. Reference is hereby made to the description given above. Below, only the additional features and differences of the embodiments shown in FIGS. 4 to 7 in comparison to the embodiments of FIGS. 1 to 3 will be explained. Within the scope of the present invention, each of the additional features "1" to "4" described below can be combined with an embodiment shown in FIGS. 1 to 3.

Additional Feature "1"

Figure 4:
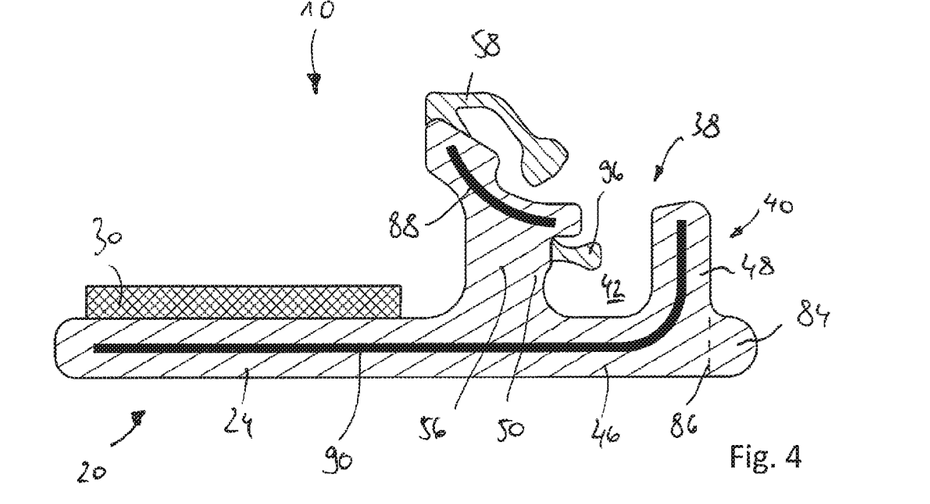
FIG. 4 shows a cross section of another embodiment of a profile strip.
Figure 5:
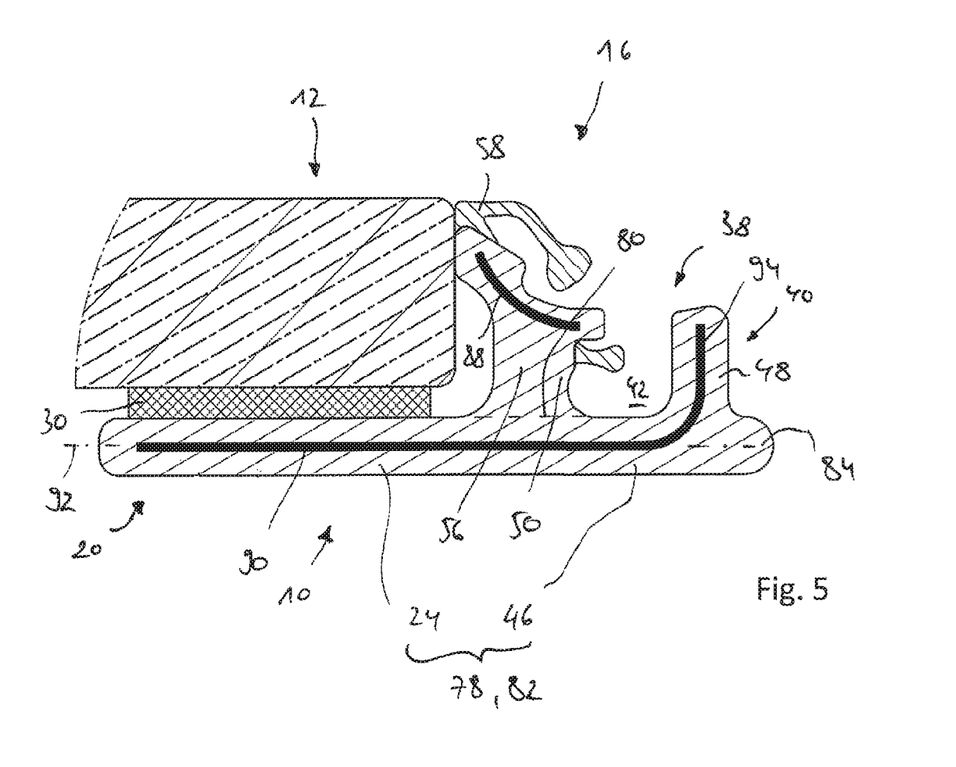
FIG. 5 shows a cross section of an embodiment of a module comprising a profile strip as shown in FIG. 4 as well as a windshield.
Figure 6:
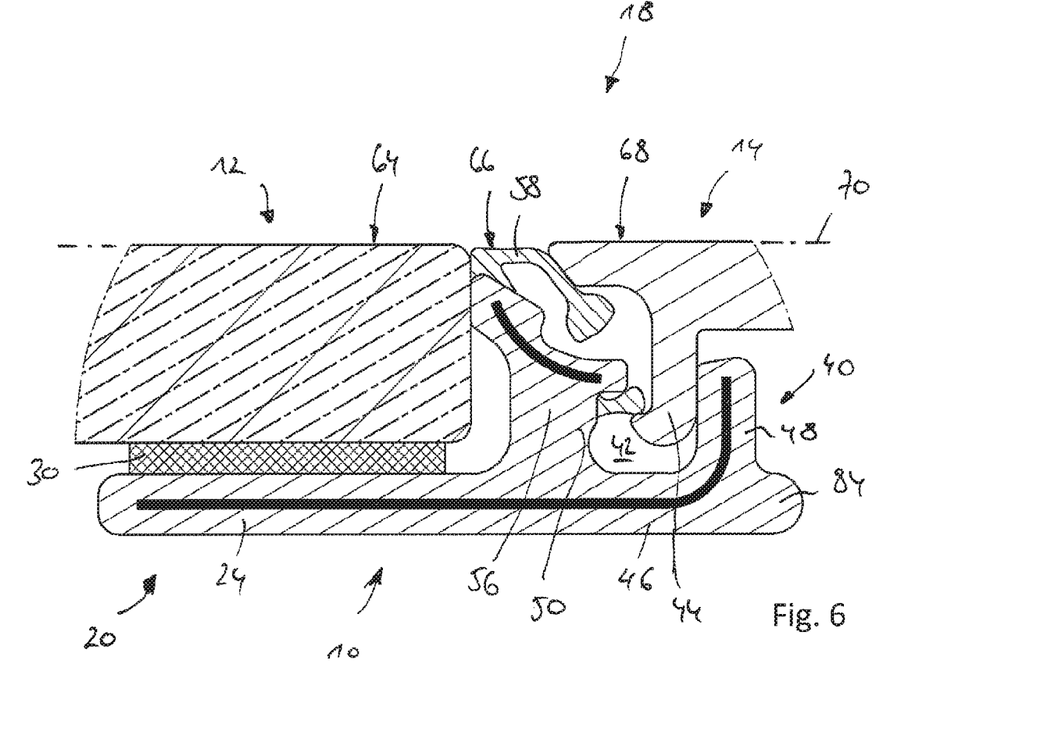
FIG. 6 shows a cross section of an embodiment of a profile strip arrangement comprising the module as shown in FIG. 5 as well as a windshield cowl cover.

The base section 78 of the profile strip 10 shown in FIGS. 4 to 6 has a material projection 84 arranged adjacent to the outer leg 48. The material projection 84 has a nub-like cross section and, starting from a rim of the outer leg 48 that is demarcated by a broken line 86, extends outwards. The material projection 84 is arranged at the level of the base section 78 and it is an integral part of the base section 78.

In comparison to the embodiments shown in FIGS. 1 to 3, the material projection 84 here allows a further improved support of a module 16 when the module 16 is arranged upright.

Additional Feature "2"

The embodiments shown in FIGS. 4 to 7 also comprise reinforcement inserts 88, 90 that extend in the lengthwise extension of the profile strip 10 and that are especially made of a metal material. For example, a reinforcement insert 88 is provided in order to reinforce an upper area of the central section 56 when it is in its installed state.

In particular, a reinforcement insert 90 is provided that reinforces the base section 78. The first partial section of the reinforcement insert 90 extends along a straight plane 92 in such a way that a first area reinforces the connecting section 24 and a second area reinforces the bottom section 46.

It is possible for the reinforcement insert 90 to extend along the plane 92 all the way into the material projection 84.

The drawing shows a configuration in which the reinforcement insert 90 has a partial section 94 that reinforces the outer leg 48 of the material section 40.

Additional Feature "3"

Another special aspect of the embodiments shown in FIGS. 4 to 6 lies in the fact that the side of the outer leg 48 facing the groove-shaped receiving area 42 is free of undercuts.

Additional Feature "4"

The inner leg 50 serves to arrange a latching element 96 that protrudes in the form of a barb into the groove-shaped receiving area 42, so that it can be latched there with the latching section 44 of the windshield cowl cover 14 (see FIG. 6).

The latching element 96 is preferably made of a softer, elastically more yielding material than the material of the profile strip 10, that is to say, the material of the base section 78, of the central section 56 and of the legs 48, 50 as well as of the material projection 84.

Figure 7:
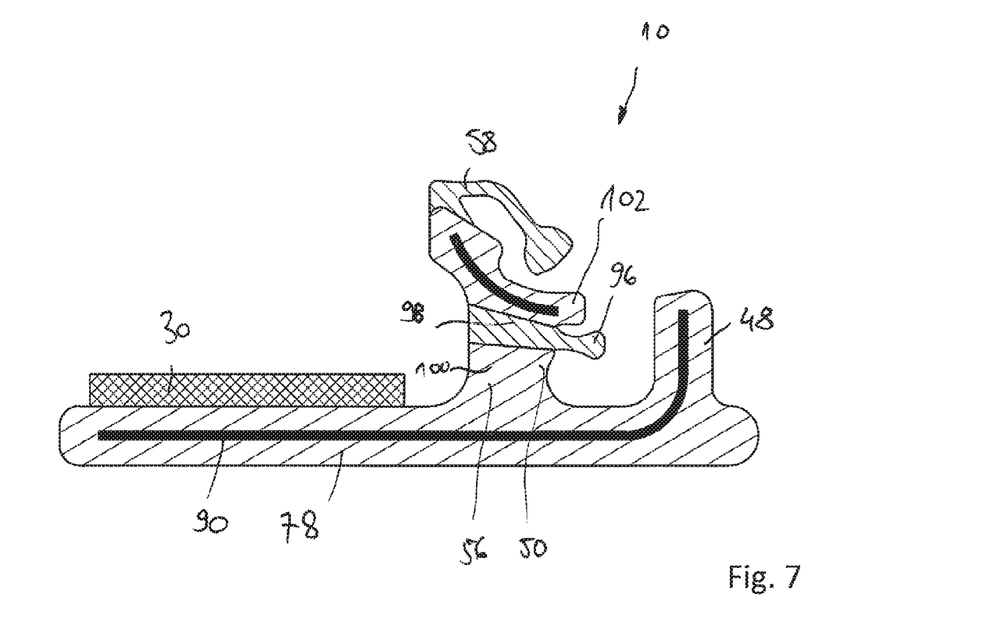
FIGS. 7 to 11 show cross sections of further embodiments of a profile strip.

In a modification of the profile strip 10 shown in FIGS. 4 to 6, it is possible for the latching element 96 to be formed by a projection of a soft layer of material 98 which divides the central section 56 into a material section 100 facing the bottom and a material section 102 facing the sealing element (see FIG. 7).

Figure 8:
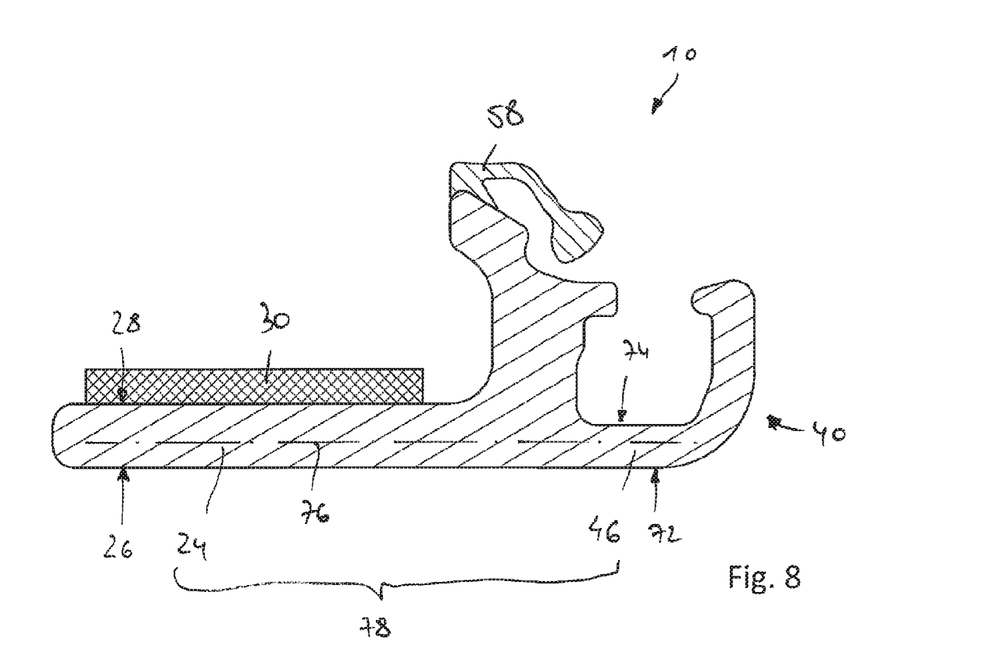

Based on the embodiments shown in FIGS. 1 to 3 or 4 to 7, other modifications are also possible. For instance, it is possible for the bottom section 46 of the material section 40 to be thinner than the connecting section 24. This can be achieved, for example, in that the bottom 26 and the bottom 72 of the connecting section 24 or of the bottom section 46 are arranged within a shared straight plane and thus make a stepless transition into each other, whereas the top 28 of the connecting section 24 and the top 74 of the bottom section 46 are offset relative to each other, for instance, so that the bottom section 46 is thinner than the connecting section 24 (see FIG. 8).

Figure 9:
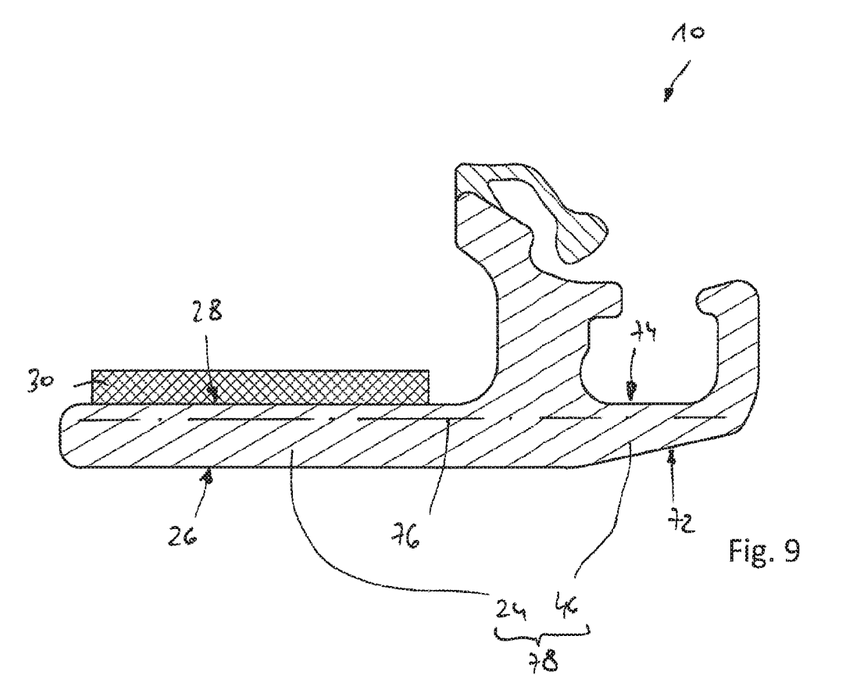
Figure 10:
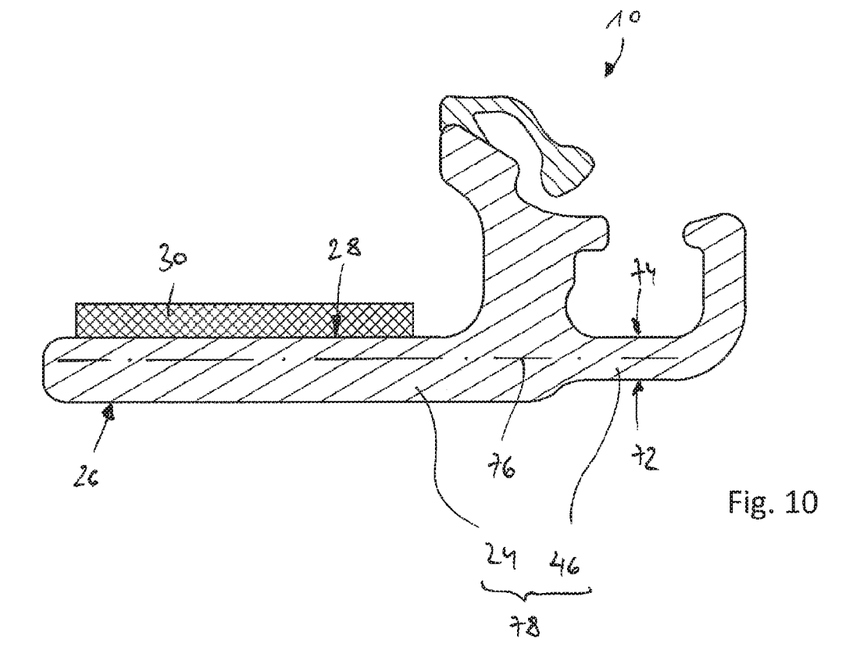

As FIGS. 9 and 10 show, it is also possible, for example, for the top 28 and the top 74 of the connecting section 24 and of the bottom section 46 to be arranged at the same level and for the bottom 26 and the bottom 72 to be slanted relative to each other (see FIG. 9) or stepped relative to each other (see FIG. 10).

Owing to the modifications described above with reference to FIGS. 8 to 10, the plane 76 along which the base section 78 extends is arranged offset further in the direction of the bottom 26 (see FIG. 8) or further in the direction of the top 28 (see FIGS. 9 and 10) relative to the connecting section 24 and relative to a central layer of material.

Figure 11:
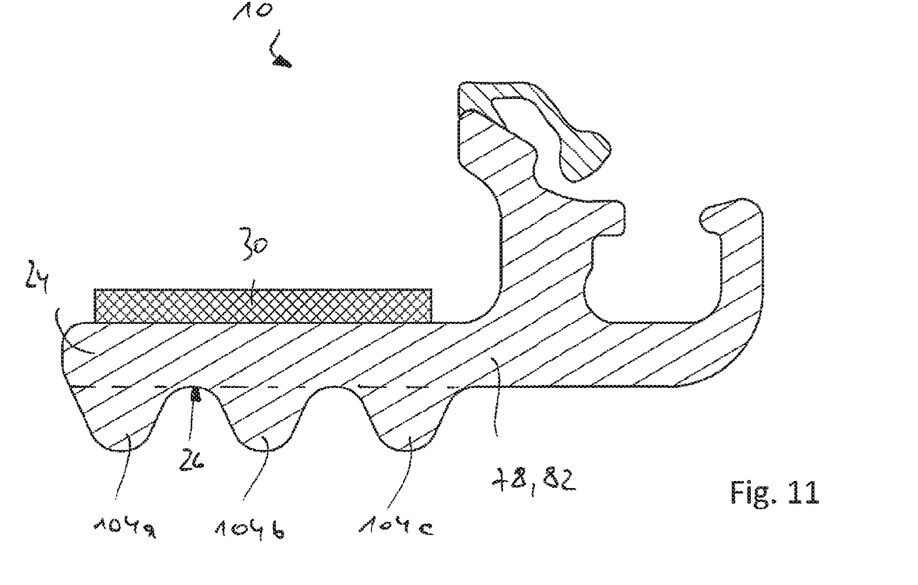

FIG. 11 shows another modification of a profile strip 10. Starting from the base section 78, which is configured as a flat element section 82, the bottom 26 of the connecting section 24 has at least one material widening 104a, 104b, 104c. The latter can serve to rest on a crossbeam of the body of a motor vehicle.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A profile strip arrangement comprising:
a profile strip having a first connecting area configured to establish a connection to an edge area of a windshield of a motor vehicle and having a second connecting area configured to establish a connection to a windshield cowl cover situated adjacent to the windshield, wherein the first connecting area has a connecting section configured to establish a connection to an inside of the windshield and wherein the second connecting area has a U-shaped or V-shaped material section having two legs which delimit a groove-shaped receiving area configured to receive a latching section of the windshield cowl cover so as to latch the latching section, and wherein, as seen in a cross section of the profile strip, at least a partial layer of the connecting section, which is oriented in parallel to a top of the connecting section facing the windshield, and at least a partial layer of a bottom section of the U-shaped or V-shaped material section together form a continuous base section of the profile strip which extends in one plane and from which the legs of the U-shaped or V-shaped material section project; and
a material projection configured as a support element and arranged adjacent to one of the legs of the U-shaped or V-shaped material section that is arranged, relative to the bottom section, on a side facing away from the connecting section, wherein the material projection is arranged at a level of the base section.

2. The profile strip arrangement according to claim 1, wherein the base section extends in a straight plane.

3. The profile strip arrangement according to claim 1, wherein the connecting section and the bottom section make a stepless transition into each other at their respective bottoms and/or at their respective tops.

4. The profile strip arrangement according to claim 1, wherein the base section is a flat element section.

5. The profile strip arrangement according to claim 1, further comprising at least one reinforcement insert which reinforces the profile strip along a lengthwise extension of the profile strip.

6. The profile strip arrangement according to claim 5, wherein at least a first partial section of the at least one reinforcement insert extends in a plane as seen in the cross section of the profile strip, whereby a first area of the first partial section is at least partially arranged in the connecting section and a second area of the first partial section is arranged in the bottom section.

7. The profile strip arrangement according to claim 5, wherein the at least one reinforcement insert has at least one partial section which reinforces one of the legs of the U-shaped or V-shaped material section.

8. The profile strip arrangement according to claim 1, wherein the material projection has a nub-like cross section.

9. The profile strip arrangement according to claim 1, wherein the material projection and the base section are made of the same material.

10. The profile strip arrangement according to claim 1, wherein the material projection is reinforced by at least one reinforcement insert of the profile strip.

11. The profile strip arrangement according to claim 1, wherein the legs of the U-shaped or V-shaped material section include an inner leg and an outer leg, wherein the profile strip has a central section that is adjacent to, or that forms, the inner leg of the U-shaped or V-shaped material section and that, after installation, more closely adjoins a rim of the windshield than the outer leg of the U-shaped or V-shaped material section does, and wherein the central section projects from the base section.

12. The profile strip arrangement according to claim 11, wherein a cross section of the central section is thicker than the outer leg of the U-shaped or V-shaped material section.

13. The profile strip arrangement according to claim 11, wherein the central section has a sealing element configured to create an external seal between adjacent rims of the windshield and of the windshield cowl cover.

14. The profile strip arrangement according to claim 11, wherein the central section and/or the outer leg of the U-shaped or V-shaped material section has a latching element that protrudes into the receiving area and that is configured to be latched to the latching section of the windshield cowl cover.

15. The profile strip arrangement according to claim 14, wherein the latching element is formed by a projection of a soft layer of material that divides the central section into a first material section facing the bottom and a second material section facing the sealing element.

16. The profile strip arrangement according to claim 1, wherein, in an installed state of the profile strip arrangement, an outside of the windshield cowl cover, an outside of the profile strip and an outside of the windshield are flush with each other.

17. The profile strip arrangement according to claim 1, wherein the first partial section of the at least one reinforcement insert extends in a straight plane as seen in the cross section of the profile strip.

18. A profile strip arrangement comprising:
a profile strip having a first connecting area configured to establish a connection to an edge area of a windshield of a motor vehicle and having a second connecting area configured to establish a connection to a windshield cowl cover situated adjacent to the windshield, wherein the first connecting area has a connecting section configured to establish a connection to an inside of the windshield and wherein the second connecting area has a U-shaped or V-shaped material section having two legs which delimit a groove-shaped receiving area configured to receive a latching section of the windshield cowl cover so as to latch the latching section,
wherein, as seen in a cross section of the profile strip, at least a partial layer of the connecting section, which is oriented in parallel to a top of the connecting section facing the windshield, and at least a partial layer of a bottom section of the U-shaped or V-shaped material section together form a continuous base section of the profile strip which extends in one plane and from which the legs of the U-shaped or V-shaped material section project,
wherein the legs of the U-shaped or V-shaped material section include an inner leg and an outer leg, wherein the profile strip has a central section that is adjacent to, or that forms, the inner leg of the U-shaped or V-shaped material section and that, after installation, more closely adjoins a rim of the windshield than the outer leg of the U-shaped or V-shaped material section does, and wherein the central section projects from the base section,
wherein the central section and/or the outer leg of the U-shaped or V-shaped material section has a latching element that protrudes into the receiving area and that is configured to be latched to the latching section of the windshield cowl cover, and
wherein the latching element is formed by a projection of a soft layer of material that divides the central section into a first material section facing the bottom and a second material section facing the sealing element.

* * * * *